United States Patent
Desai et al.

(10) Patent No.: US 11,604,623 B2
(45) Date of Patent: Mar. 14, 2023

(54) ELECTRONIC DEVICE WITH IMAGING BASED MUTE CONTROL

(71) Applicant: MOTOROLA MOBILITY LLC, Wilmington, DE (US)

(72) Inventors: Rahul B Desai, Hoffman Estates, IL (US); Amit Kumar Agrawal, Bangalore (IN); Olivier D Meirhaeghe, Lincolnshire, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/346,395

(22) Filed: Jun. 14, 2021

(65) Prior Publication Data

US 2022/0398064 A1 Dec. 15, 2022

(51) Int. Cl.
H04N 7/15 (2006.01)
G06F 3/16 (2006.01)
H04M 1/72454 (2021.01)
G06V 40/20 (2022.01)

(52) U.S. Cl.
CPC ............. *G06F 3/165* (2013.01); *G06V 40/28* (2022.01); *H04M 1/72454* (2021.01); *H04N 7/15* (2013.01); *H04R 2430/01* (2013.01)

(58) Field of Classification Search
CPC ........ G06F 3/16; G06K 8/00; G06K 9/00335; H04M 1/72454; H04N 7/15; H04N 7/147; H04N 7/152; G10L 15/25; H04R 29/004; H04R 2430/01
USPC ........................................... 348/14.01–14.16
See application file for complete search history.

(56) References Cited

U.S. PATENT DOCUMENTS

| | | | |
|---|---|---|---|
| 7,532,714 B1 * | 5/2009 | Miller | H04N 7/15 379/202.01 |
| 7,617,457 B2 | 11/2009 | Kortum et al. | |
| 8,739,045 B2 | 5/2014 | Pang | |
| 9,071,692 B2 | 6/2015 | Sanaullah et al. | |
| 9,516,268 B2 | 12/2016 | Heda et al. | |
| 11,082,465 B1 * | 8/2021 | Chavez | H04L 65/4038 |
| 11,082,661 B1 * | 8/2021 | Pollefeys | H04N 7/152 |
| 2001/0054070 A1 | 12/2001 | Savage, III | |
| 2014/0022332 A1 | 1/2014 | Wang | |
| 2014/0071223 A1 | 1/2014 | Chatterjee | |

(Continued)

*Primary Examiner* — Melur Ramakrishnaiah
(74) *Attorney, Agent, or Firm* — Isidore PLLC

(57) ABSTRACT

An electronic device, computer program product, and method mitigates loss of communication between participants in a communication session when a local participant attempts to speak without manually unmuting the electronic device. The electronic device includes an image capturing device, a user interface device having a microphone, and a controller. The controller is communicatively coupled to the image capturing device and to the user interface device. The controller monitors, during the communication session with a second electronic device, an image stream received from the image capturing device for movements by the local participant in the communication session. The controller autonomously generates a prompt to unmute the microphone in response to determining that the microphone is muted while identifying at least one of a speaking movement of a mouth of the local participant to speak or a gesture by the local participant that correlates with the participant wanting to speak.

20 Claims, 7 Drawing Sheets

(56) References Cited

U.S. PATENT DOCUMENTS

| | | | |
|---|---|---|---|
| 2014/0320584 A1* | 10/2014 | Kumar | H04N 7/147 348/14.03 |
| 2014/0379351 A1* | 12/2014 | Raniwala | G06V 40/20 704/270 |
| 2015/0264316 A1* | 9/2015 | Sanaullah | H04N 7/15 348/14.07 |
| 2016/0094355 A1 | 3/2016 | Waltermann | |
| 2016/0104094 A1 | 4/2016 | Yom-Tov | |
| 2016/0255126 A1 | 9/2016 | Sarris | |
| 2016/0381720 A1 | 12/2016 | Baek | |
| 2018/0358034 A1 | 12/2018 | Chakra et al. | |
| 2018/0376108 A1 | 12/2018 | Bright-Thomas | |
| 2020/0110572 A1* | 4/2020 | Lenke | H04N 7/15 |
| 2020/0178045 A1 | 6/2020 | Sung | |
| 2021/0005098 A1 | 1/2021 | Davis | |
| 2021/0014074 A1 | 1/2021 | Dhawan | |
| 2021/0014455 A1 | 1/2021 | Gorny | |
| 2021/0201935 A1* | 7/2021 | Seethaler | H04R 29/004 |
| 2022/0191257 A1 | 6/2022 | Aceron | |

\* cited by examiner

ELECTRONIC DEVICE WITH IMAGING BASED MUTE CONTROL

BACKGROUND

1. Technical Field

The present disclosure relates generally to electronic devices that support/enable video communication sessions using a camera and a microphone, and more particularly to electronic devices that support/enable video communication sessions and having a microphone that can be muted and unmuted during the communication session.

2. Description of the Related Art

User communication devices such as mobile phones, desktop workstations, laptops, and tablets are often equipped with a front side camera and a microphone to enable online human communication. For privacy and other reasons, a local participant can turn off the front side camera. To avoid unintentional interruptions to other participants due to ambient noise, feedback, etc., the local participant can mute the microphone. Although muting has benefits, the muted microphone results in a degradation to the user experience when the local participant does seek to speak to the other participants but fails/forgets to unmute the microphone. When the camera of the local participant is turned off, the other participants may not even know that the local participant wants to speak or has started speaking. Even if the camera is on, other participants may not have the image stream of the local participant presented on their respective second electronic device. The appropriate time during the communication session for the local participant to speak may be irrecoverably missed. For example, the current speaker or presenter may pause or expressly ask if there are any questions. When the local participant's attempt to speak is not noticed by the other participants, the speaker or presenter moves on without ever hearing or being aware of the attempt by the local participant to speak.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
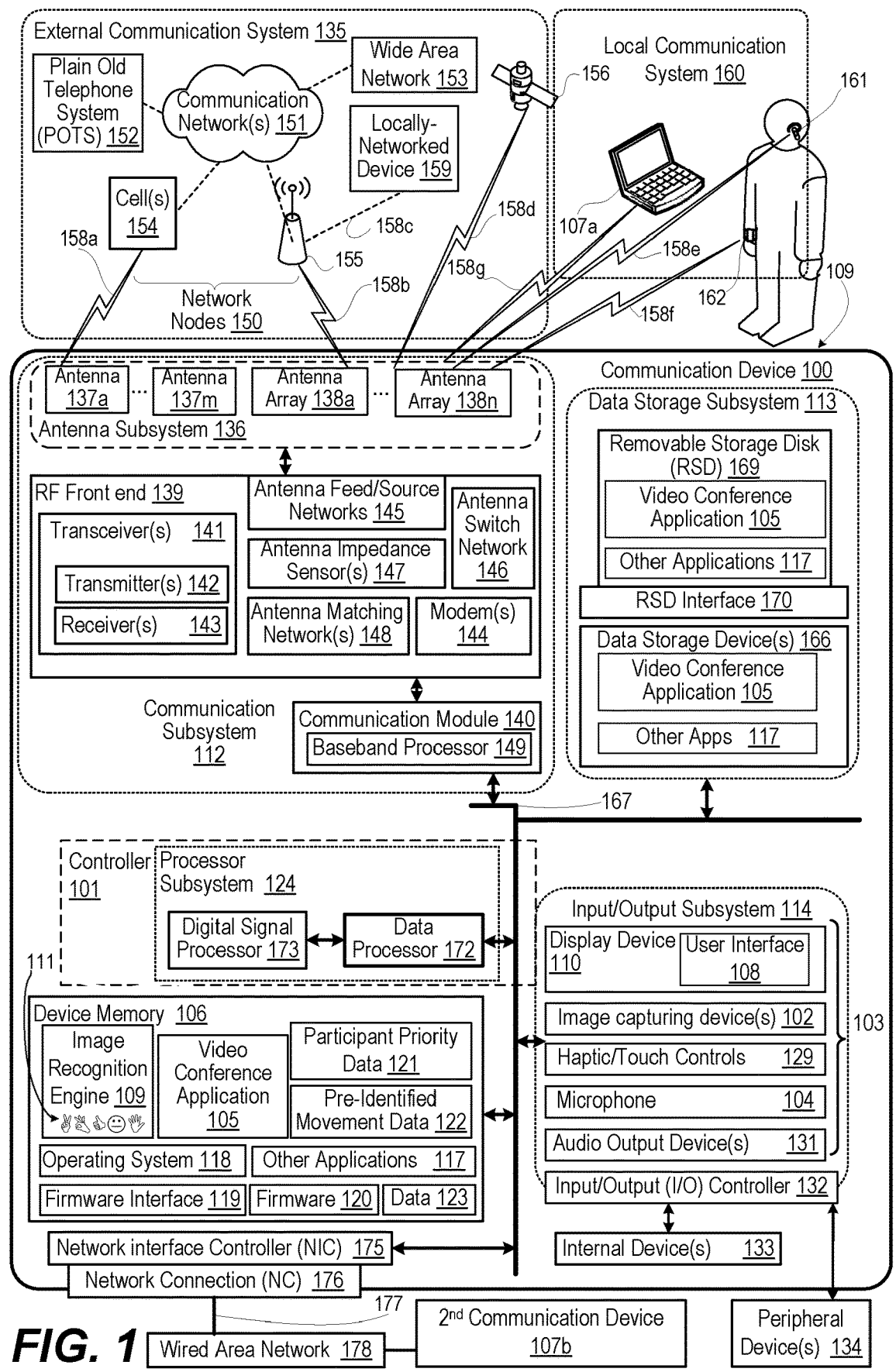
FIG. 1 depicts a functional block diagram of a communication environment of a communication device that reduces loss of communication between participants in a communication session when a remote participant attempts to speak without manually unmuting a microphone of the communication device, and within which the features of the present disclosure are advantageously implemented, according to one or more embodiments.

According to aspects of the present innovation, an electronic device, computer program product, and method reduces loss of verbal communication between participants in a communication session when a local participant attempts to speak without manually unmuting a microphone of the electronic device. The electronic device includes an image capturing device, at least one user interface device, including at least one microphone, and a controller. The controller is communicatively coupled to the image capturing device and to the at least one user interface device. During the communication session with one or more second electronic devices, the controller monitors a status of the at least one microphone during the communication session. While the microphone is muted, the controller monitors an image stream received from the image capturing device for movements by the local participant in the communication session. The controller autonomously generates a prompt to unmute the microphone in response to determining that the microphone is muted while identifying at least one of a speaking movement of a mouth of the local participant or a gesture by the local participant associated with unmuting the microphone. As an example, the prompt can be an alert presented to the local participant to manually unmute the at least one microphone. As another example, the prompt can include a trigger that automatically unmutes the at least one microphone, without requiring manual unmuting by the local participant.

According to aspects of the present disclosure, an electronic device, locally managed by a controller, automatically intervenes on behalf of a local participant in a communication session that is using the electronic device. The communication session can be audio only or can include video. In particular, the electronic device can determine, based on visually monitoring movements of the local participant during the communication session, that the local participant is attempting to speak to other remote participants who are using respective second communication devices. Conventional inadvertent mute detection relies upon local audio input. Use of the local image stream at the electronic device instead, whether shared or not with remote electronic devices, avoids reliance on audio only controls that could be interfered with by local noises not made by the local participant.

The present innovation also does not rely upon a remote participant noticing the movements by the local participant in the image stream and intervening to allow the local participant to speak. The electronic device automatically handles the attempt by the local participant to speak without creating a disruption in the communication session. In one or more embodiments, the controller automatically mitigates a situation where the local participant attempts to speak without first unmuting the at least one microphone. In one or more embodiments, the at least one microphone is "soft"

muted in that the audio input is still available to the controller but not transmitted to the one or more second electronic devices. The controller can augment the determination of the attempt to speak by comparing the audio input to the movements detected. In an alternate embodiment, the controller can also determine the attempt to speak without reference to the audio input. In one or more embodiments, the muting of the at least one microphone is "hard" in that the audio input is turned off at the at least one microphone and is not available. The controller is not dependent on the audio input to determine whether the local participant is attempting to speak.

The features of the present disclosure are implemented within an environment that allows participants to mute their electronic device for privacy or to avoid ambient noises from disturbing other participants, and the disclosure then allows the local device to autonomously unmute the electronic device when the local participant begins speaking but forgets to first unmute their electronic device. In an example, a local participant can have their electronic device in a locally muted state when the local participant decides to begin speaking or attempts to speak. According to aspects of the present disclosure, the electronic device improves a video communication session by automatically detecting situations in which the local participant(s) present certain gestures or movements of the mouth that visually indicate an attempt by that participant to speak.

In addition, in order to mitigate the loss of communication due to a failure of a participant to unmute their own electronic device, the present disclosure enables participants to more intuitively request the opportunity to speak. Conventional video communication systems require the participant to manual trigger a control on a user interface to unmute or to send a "raise hand" indication. Having a visually triggered indication, a participant can more intuitively speak or gesture to trigger an automatic alert to the presenting participant. One or more types of alerts can be triggered.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 is a functional block diagram of an electronic device within an operating environment, and more particularly communication device 100 within which several of the features of the present disclosure are advantageously implemented. Communication device 100 is managed by controller 101, which is communicatively coupled to image capturing device 102 and to at least one user interface device 103 that includes at least one microphone 104. Controller 101 is also communicatively coupled to at least one display device 110, which is an example user interface device 103. Controller 101 executes video conference application 105 stored in device memory 106 to configure communication device 100 to enable communication between participants in a video communication session and autonomously provide notification(s) when a local participant attempts to speak without manually unmuting the at least one microphone 104 of communication device 100. In particular, controller 101 monitors, during a communication session with one or more second communication devices 107a-107b, an image stream received from image capturing device 102 for specific movements and/or gestures by a local participant in the communication session while the at least one microphone 104 is muted. Controller 101 can use image recognition engine 109 to characterize the movement. As an example, image recognition engine 109 can be a neural net that is trained to recognize anatomical features including facial features and hand movements. As another example, image recognition engine 109 can have a library objects 111 of objects that are used to compare to images. As an additional example, image recognition engine 109 can perform a two-dimensional correlation with library objects 111. Controller 101 monitors a status of the at least one microphone 104 during the communication session. In response to controller 101 determining that at least one microphone 104 is muted while identifying at least one of a speaking movement of a mouth of the local participant or a gesture by the local participant to unmute at least one microphone 104, controller 101 autonomously generates and presents on user interface 108, a prompt to unmute the at least one microphone 104.

Communication device 100 can be one of a host of different types of devices, including but not limited to, a mobile cellular phone, satellite phone, or smart-phone, a laptop, a net-book, an ultra-book, a networked smart watch or networked sports/exercise watch, and/or a tablet computing device or similar device that can include wireless and/or wired communication functionality. As an electronic device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem. Within the description of the remaining figures, references to similar components presented in a previous figure are provided the same reference numbers across the different figures. Where the named component is presented with different features or functionality, a different reference numeral or a subscripted reference numeral is provided (e.g., 100a in place of 100).

Referring to the specific component makeup and the associated functionality of communication device 100 of FIG. 1. In one or more embodiments, communication device 100 has device memory 106, communication subsystem 112, data storage subsystem 113, and input/output (I/O) subsystem 114. Device memory 106 and each subsystem (112, 113, and 114) are managed by controller 101. Device memory 106 includes program code for applications, such as video conference application 105, image recognition engine 109, and other application(s) 117. Device memory 106 further includes operating system (OS) 118, firmware interface 119, such as basic input/output system (BIOS) or Uniform Extensible Firmware Interface (UEFI), and firmware 120. Device memory 106 includes participant priority data 121, pre-identified movement data 122 and other computer data 123 used by video conference application 105. Examples of participant priority data 121 include organizational hierarchy, assigned role in communication session, peer rating, and participation metrics. Examples of pre-identified movement data 122 can include dimensions of mouth opening and timing of mouth movements that continue for a minimum amount of time. Examples of pre-identified movement data 122 can also include finger positioning and directions of movement of the fingers, the hand, or the arm.

Controller 101 includes processor subsystem 124 that executes program code to provide operating functionality of communication device 100. The software and/or firmware modules have varying functionality when their corresponding program code is executed by processor subsystem 124 or secondary processing devices within communication device 100. Processor subsystem 124 of controller 101 can execute program code of video conference application 105 and other applications 117 to configure communication device 100 to perform specific functions.

I/O subsystem 114 includes user interface components such as display device 110, image capturing device 102, touch/haptic controls 129, microphone 104, and audio output device(s) 131. I/O subsystem 114 also includes I/O controller 132. I/O controller 132 connects to internal devices 133, which are internal to housing 109, and to peripheral devices 134, such as external speakers, which are external to housing 109 of communication device 100. Internal devices 133 include computing, storage, communication, or sensing components depicted within housing 109. I/O controller 132 supports the necessary configuration of connectors, electrical power, communication protocols, and data buffering to act as an interface between internal devices 133 and peripheral devices 134 and other components of communication device 100 that use a different configuration for inputs and outputs.

Communication subsystem 112 of communication device 100 enables wireless communication with external communication system 135. Communication subsystem 112 includes antenna subsystem 136 having lower band antennas 137a-137m and higher band antenna arrays 138a-138n that can be attached in/at different portions of housing 109. Communication subsystem 112 includes radio frequency (RF) front end 139 and communication module 140. RF front end 139 includes transceiver(s) 141, which includes transmitter(s) 142 and receiver(s) 143. RF front end 139 further includes modem(s) 144. RF front end 139 includes antenna feed/source networks 145, antenna switch network 146, antenna impedance sensor(s) 147, and antenna matching network(s) 148. Communication module 140 of communication subsystem 112 includes baseband processor 149 that communicates with controller 101 and RF front end 139. Baseband processor 149 operates in a baseband frequency range to encode data for transmission and decode received data, according to a communication protocol. Modem(s) 144 modulate baseband encoded data from communication module 140 onto a carrier signal to provide a transmit signal that is amplified by transmitter(s) 142. Modem(s) 144 demodulates each signal received from external communication system 135 detected by antenna subsystem 136. The received signal is amplified and filtered by receiver(s) 143, which demodulate received encoded data from a received carrier signal. Antenna feed/source networks 145 transmits or receives from particular portions of antenna subsystem 136 and can adjust a phase between particular portions of antenna subsystem 136. Antenna switch network 146 can connect particular combinations of antennas (137a-137m, 138a-138n) to transceiver(s) 141. Controller 101 can monitor changes in antenna impedance detected by antenna impedance sensor(s) 147 for determining portions of antenna subsystem 136 that are blocked. Antenna matching network(s) 148 are connected to particular lower band antennas 137a-137m to tune impedance respectively of lower band antennas 137a-137m to match impedance of transceivers 141. Antenna matching network(s) 148 can also be used to detune the impedance of lower band antennas 137a-137m to not match the impedance of transceivers 141 to electromagnetically isolate a particular antenna.

In one or more embodiments, controller 101, via communication subsystem 112, performs multiple types of over-the-air (OTA) communication with network nodes 150 of external communication system 135. Particular network nodes 150 can be part of communication networks 151 of public land mobile networks (PLMNs) that provide connections to plain old telephone systems (POTS) 152 for voice calls and wide area networks (WANs) 153 for data sessions. WANs 153 can include Internet and other data networks. The particular network nodes 150 can be cellular "cells", base nodes, or base stations 154 that support cellular OTA communication using RAT as part of a radio access network (RAN). Unlike earlier generations of cellular services, where voice and data were handled using different RATs, both are now integrated with voice being considered one kind of data communication. Conventionally, broadband, packet-based transmission of text, digitized voice, video, and multimedia communication are provided using Fourth generation (4G) RAT of evolved UTMS radio access (E-UTRA), referred to a Long Term Evolved (LTE), although some cellular data service is still being provided by third generation (3G) Universal Mobile Telecommunications Service (UMTS). A fifth generation (5G) RAT, referred to as fifth generation new radio (5G NR), is being deployed to at least augment capabilities of 4G LTE with a yet higher capability of data transfer. Development continues for what will be six generation (6G) RATs and more advanced RATs. With wireless frequency spectrum seemingly ever expanding, additional antennas 137a-137m are incorporated to support newer radio access technologies (RATs) and multi band operation. Dual low band (2L) or quad low band (4L) multiple input multiple output (MIMO) operation dictates multiple antennas communicate on multiple bands simultaneously.

In one or more embodiments, network nodes 150 can be access node(s) 155 that support wireless OTA communication. Communication subsystem 112 can receive OTA communication from location services such as provided by global positioning system (GPS) satellites 156. Communication subsystem 112 communicates via OTA communication channel(s) 158a with base stations 154. Communication subsystem 112 communicates via wireless communication channel(s) 158b with access node 155. In one or more particular embodiments, access node 155 supports communication using one or more IEEE 802.11 wireless local area network (WLAN) protocols. Wi-Fi is a family of wireless network protocols, based on the IEEE 802.11 family of standards, which are commonly used between user devices and network devices that provide Internet access. In one or more particular embodiments, communication subsystem 112 communicates with one or more locally networked devices 159 via wired or wireless link 158c provided by access node 155. Communication subsystem 112 receives downlink broadcast channel(s) 158d from GPS satellites 156 to obtain geospatial location information.

In one or more embodiments, controller 101, via communication subsystem 112, performs multiple types of OTA communication with local communication system 160. In one or more embodiments, local communication system 160 includes wireless headset 161 and smart watch 162 that are coupled to communication device 100 to form a personal access network (PAN). Communication subsystem 112 communicates via low power wireless communication channel(s) 158e with headset 161. Communication subsystem 112 communicates via second low power wireless communication channel(s) 158f, such as Bluetooth, with smart watch 162. In one or more particular embodiments, communication subsystem 112 communicates with second communication device(s) 107a via wireless link 158g to form an ad hoc network.

Data storage subsystem 113 of communication device 100 includes data storage device(s) 166. Controller 101 is communicatively connected, via system interlink 167, to data storage device(s) 166. Data storage subsystem 113 provides applications, program code, and stored data on nonvolatile storage that is accessible by controller 101. For example, data storage subsystem 113 can provide a selection of applications such as video conference application 105 and other application(s) 117 that use communication services. These applications can be loaded into device memory 106 for execution by controller 101. In one or more embodiments, data storage device(s) 166 can include hard disk drives (HDDs), optical disk drives, and/or solid-state drives (SSDs), etc. Data storage subsystem 113 of communication device 100 can include removable storage device(s) (RSD(s)) 169, which is received in RSD interface 170. Controller 101 is communicatively connected to RSD 169, via system interlink 167 and RSD interface 170. In one or more embodiments, RSD 169 is a non-transitory computer program product or computer readable storage device. Controller 101 can access RSD 169 or data storage device(s) 166 to provision communication device 100 with applications and computer data, such as code for video conference application 105 and other applications 117. When executed by controller 101, the program code causes or configures communication device 100 to provide the mute alert functionality described herein.

Controller 101 includes processor subsystem 124, which includes one or more central processing units (CPUs), depicted as data processor 172. Processor subsystem 124 can include one or more digital signal processors 173 that are integrated with data processor 172 or are communicatively coupled to data processor 172, such as baseband processor 149 of communication module 140. In one or embodiments that are not depicted, controller 101 can further include distributed processing and control components that are peripheral to housing 109 or grouped with other components, such as I/O subsystem 114. Data processor 172 is communicatively coupled, via system interlink 167, to device memory 106. In one or more embodiments, controller 101 of communication device 100 is communicatively coupled via system interlink 167 to communication subsystem 112, data storage subsystem 113, and I/O subsystem 114. System interlink 167 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (system interlink 167) are illustrated in FIG. 1, it is to be understood that more, fewer, or different interconnections may be present in other embodiments.

Controller 101 manages, and in some instances directly controls, the various functions and/or operations of communication device 100. These functions and/or operations include, but are not limited to including, application data processing, communication with second communication devices, navigation tasks, image processing, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

In one or more embodiments, I/O subsystem 114 includes network interface controller (NIC) 175 with a network connection (NC) 176 on housing 109. Network cable 177 connects NC 176 to wired area network 178. Wired area network 178 can be a local area network (LAN), a campus area network (CAN), a metropolitan area network (MAN), or a wide area network (WAN). For example, NC 176 can be an Ethernet connection. Second communication devices 107b is communicatively couple to wired area network 178.

According to aspects of the present disclosure, communication device 100 can be used as a first, local electronic device for a local participant in a communication session. In an example, the local participant is using communication device 100 as a presenter to remote participants that are using respective remote second electronic devices. The second electronic devices can be remote communication devices 107 that have identical or similar components as described for communication device 100. Communication device 100 includes image capturing device 102 and at least one user interface device 103 having at least one microphone 104. Controller 101 is communicatively coupled to image capturing device 102 and to the at least one user interface device 103. Controller 101 is configured to monitor, during a communication session with one or more remote communication devices 107, an image stream received from the image capturing device 102 for movements by the local participant in the communication session. Controller 101 monitors a status of the at least one microphone 104 during the communication session. Controller 101 autonomously generates a prompt to unmute the at least one microphone 104 in response to determining that the at least one microphone 104 is muted while identifying at least one of a speaking movement of a mouth of the local participant to speak or a gesture by the local participant that correlates with the participant wanting to speak.

Figure 2A:
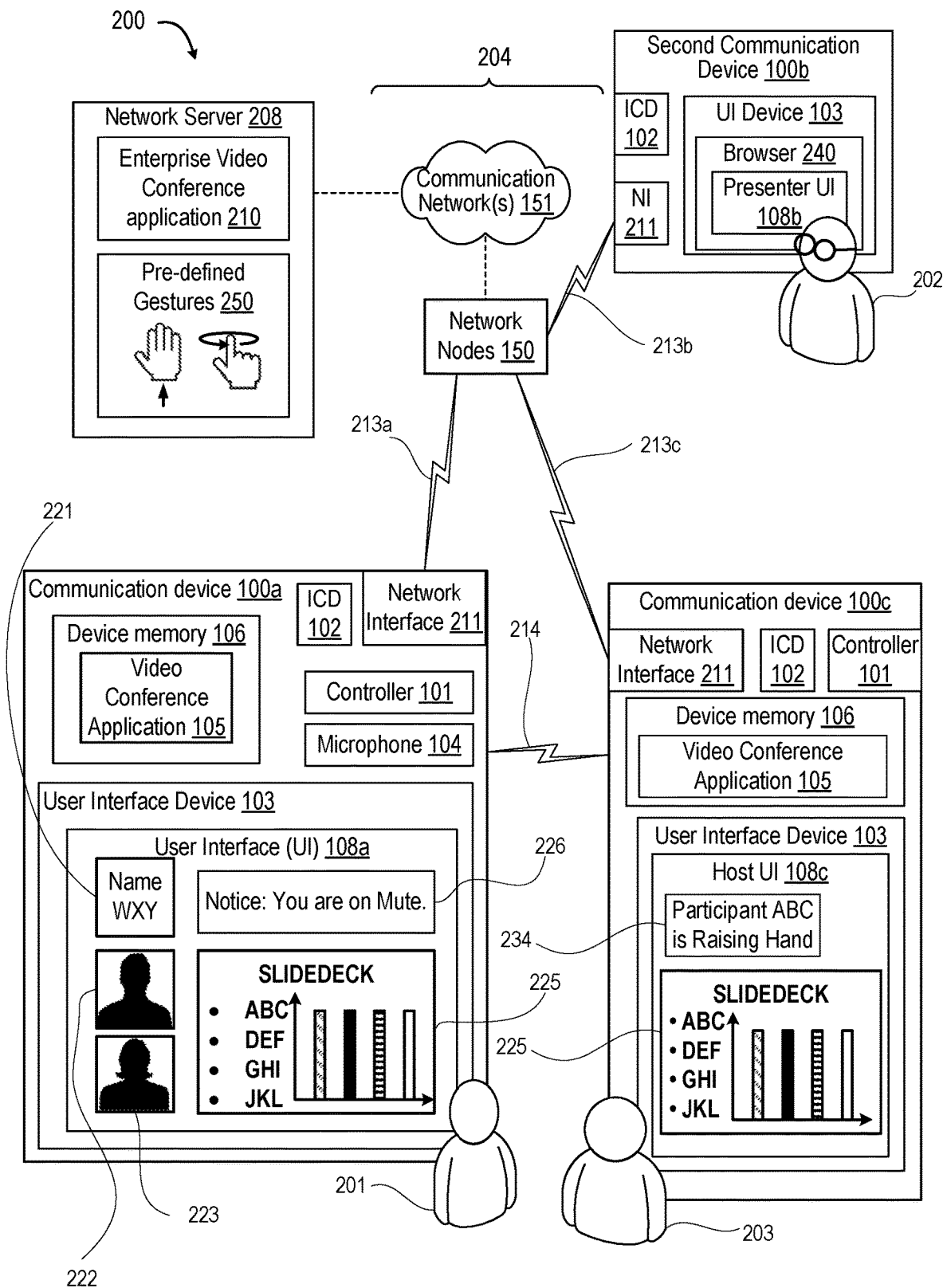
FIG. 2A depicts a functional block diagram of a communication system that supports a video communication session between two or more communication devices, according to one or more embodiments.

FIG. 2A depicts a functional block diagram of communication system 200 that supports a video communication session between first communication device 100a used by non-presenting participant 201, second communication device 100b used by presenter participant 202, and third communication device 100c used by host participant 203. First, second, and third communication devices 100a-100c are communicatively coupled via network 204 during a video communication session. In one or more embodiments, network server 208 executes enterprise video conference application 105 that facilitates setup of video conference sessions. In one or more embodiments enterprise video conference application 105 provides an interface between communication networks 151. Communication devices 100a-100c, managed by respective controllers 101, connect via local network interfaces 211, to network nodes 150 via over-the-air communication channels 213a-213c. In one or more embodiments, communication devices 100a, 100c can connect via ad hoc network connection 214. Communication devices 100a, 100c each execute video conference application 105 stored in respective device memory 106 to present user interfaces 108a, 108c on respective display devices 103. Communication device 100b includes browser 240 that downloads presenter UI 108b to display locally on display device 110b.

Communication device 100a presents user interface 108a for non-presenting participant 201 to interact with. Non-presenting participant 201 is not presenting and is not acting as host. Video conference application 105 customizes user interface 108a for non-presenting participant 201. User interface 108a receives image streams 221-223 from respective image capturing devices 102 of each communication device 100a-100c. In the presented embodiment, image stream 221 includes merely the name of non-presenting participant 201 who has turned off video sharing or whose communication device 100a does not have a working image capturing device 102. User interface 108a includes screen sharing window 225 and alert 226 that indicates that microphone 104 is muted. By monitoring the image stream, video conference application 105 detects an attempt by non-presenting participant 201 to actively participate in the video communication session by speaking.

Host participant 203 interacts with host user interface 108c that can be customized for a participant that has greater control over the video communication session. User interface 108c includes screen sharing window 225 that could be controlled by any of communication device 100a, communication device 100b or communication device 100c. Alert window 234 can provide indications of participants that are attempting to speak, allowing communication device 100c to assist communication device 100b by having host presenter 203 inform participants who are inadvertently muted.

Figure 2B:
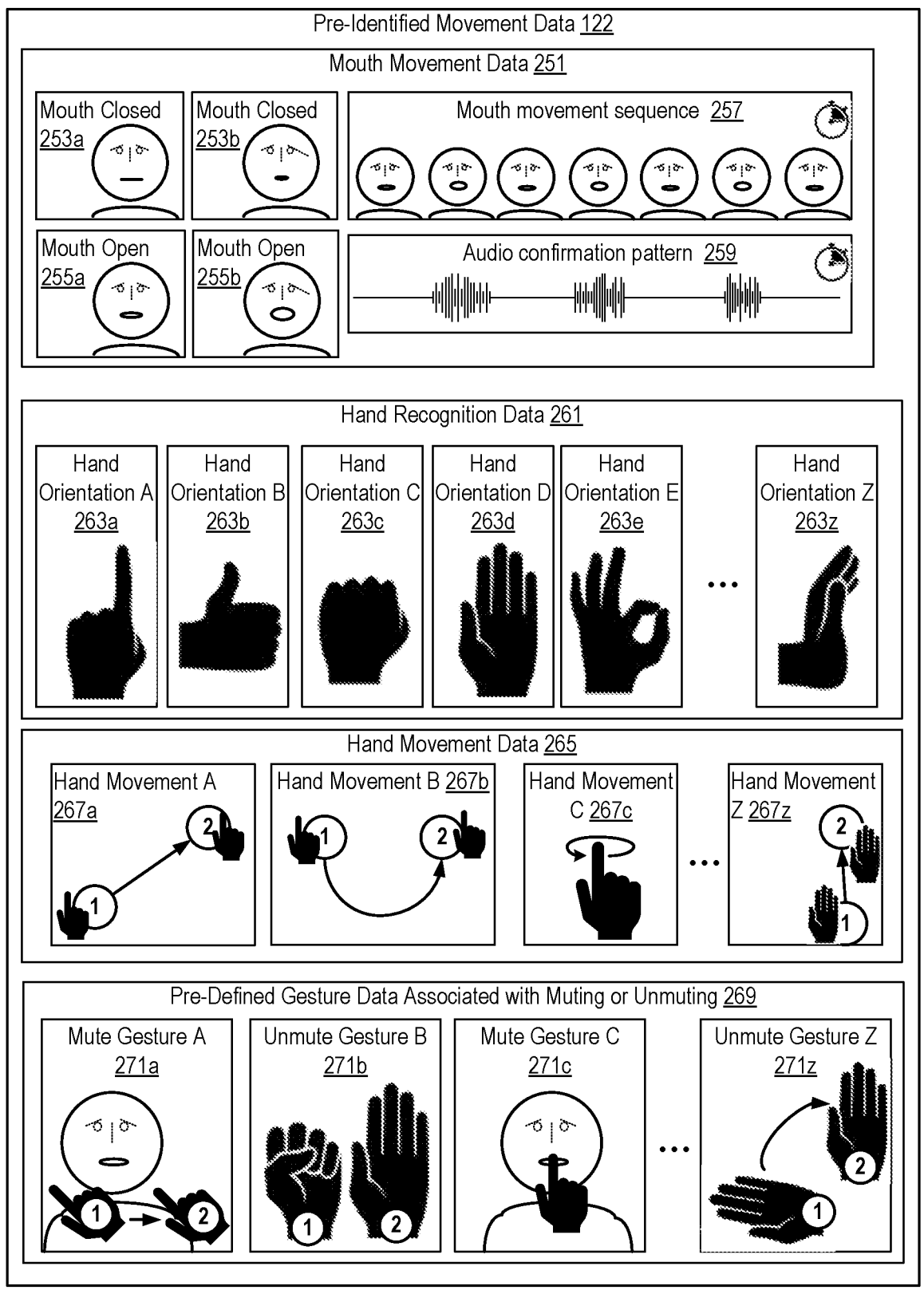
FIG. 2B depicts a diagram of example pre-defined movement data stored in memory of the communication device of FIG. 1, according to one or more embodiments.

FIG. 2B depicts a diagram of example pre-defined movement data 122 stored in device memory 106 of non-presenter communication device 100a (FIG. 2A). In an example, pre-defined movement data 122 can include mouth movement data 251. Mouth movement data 251 can include first and second mouth closed recognition images 253a-253b that depicts a closed mouth that can be compared to an image live stream. Pre-defined movement data 122 can include first and second mouth open recognition images 255a-255b that depicts an opened mouth that can be compared to the image live stream. Mouth movement sequence 257 defines a minimum number of opening and closing of the mouth during a defined time period that indicates speaking. In one or more embodiments, audio confirmation pattern 259, if available, can be matched to the mouth movement sequence 257 to confirm an attempt to speak by non-presenting participant 201 (FIG. 2A).

Pre-defined movement data 122 can include hand recognition data 261 that can be compared to the image stream to recognize that one or both hands of non-presenting participant 201 are visible within the image stream. In an example, hand orientation A 263a depicts an index finger extended from a left hand. Hand orientation B 263b depicts only a thumb extended from a right hand. Hand orientation C 263c depicts a clenched left fist. Hand orientation D 263d depicts an open left hand. Hand orientation E 263e depicts only left hand making an "OK". Hand orientation B 263b depicts only a thumb extended from a right hand. Hand orientation Z 263z depicts only thumb-side view of an open left hand.

Pre-defined movement data 122 can include hand movement data 265 that can be compared to the image stream to recognize directional movement(s) of one or both hands of non-presenting participant 201. In an example, hand movement A 267a depicts a hand moving diagonally upward and laterally. Hand movement B 267b depicts a hand moving laterally in a U-shaped curve. Hand movement C 267c depicts an index finger making a twirling motion. Hand movement Z 267z depicts one hand moving upward.

Pre-defined movement data 122 can include pre-defined gesture data 269 that are associated with automatic muting, automatic unmuting, or toggling between muting and unmuting. In an example, mute gesture A 271a describes a slashing motion of an index finger in front of a neck of non-presenting participant 201 (FIG. 2A). Unmute gesture B 271b describes a clenched fist unclenching to an open hand. Mute gesture C 271c describes an index finger held vertically in front of the mouth. Unmute gesture 271z describes palm out open hand swept in a 90° arc. The specific gestures present are for example only. It is appreciated that other, different gestures, including or involving one or both hands or a combination of hands and/or mouth movements are contemplated, and fall within the general scope of the disclosure.

Pre-defined movement data 122 can further include rule-based filtering of gesturing. As an example, a gesture that last less than a first threshold period of time, such as two (2) seconds, can be ignored as not being associated with an attempt to speak. As another example, an open hand positioned over the mouth, such as in response to a yawn or a sneeze, can be ignored as not being associated with an attempt to speak. As an additional example, a finger scratching a portion of the face can be ignored as not being associated with an attempt to speak. As a further example, holding up a hand for more than a second threshold of time, such as seven (7) seconds, can be associated with an attempt to speak.

Figure 3A:
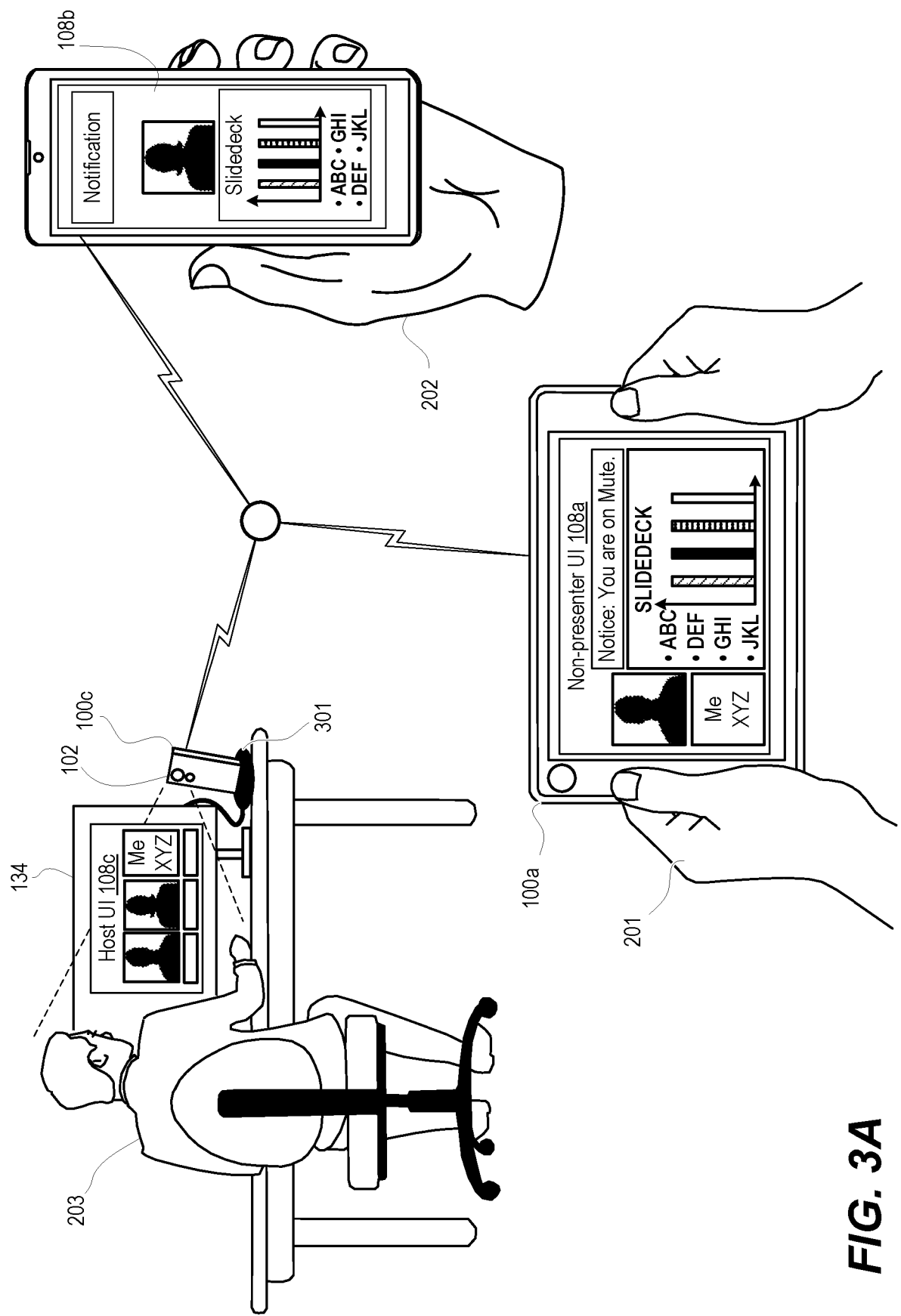
FIG. 3A depicts a front view of three communication devices each presenting a user interface for a video communication session, according to one or more embodiments.

FIG. 3A depicts a front view of three communication devices 100a-100c presenting user interfaces 108a-108c respectively tailored to a current role being played by non-presenting participant 201, presenting participant 202, and host participant 203 for a video communication session. Each of communication devices 100a-100c can be of different types, having some or all of the components of communication device 100 (FIG. 1) in different form factors. In the presented example, communication device 100a is a tablet. In one or more embodiments, communication device 100b is a smart phone. Communication device 100c can be a mobile communication device, such as a smart phone, that includes user interface device 103 that presents presenter UI 108b. Communication device 100c can be a mobile communication device, such as a smart phone, placed in dock 301 that is communicatively coupled to a peripheral device 134 (FIG. 1). In one or more embodiments, peripheral device 134 is a monitor of desktop workstation.

With reference to FIG. 2, communication system 200 includes pre-defined gestures database 250, such as maintained and distributed by network server 208. Participants 201, 203 can create custom gestures and custom spoken words that are used by respective communication devices 100a-100c. In an example, each gesture includes at least two relative positions of the hand. In another example, a gesture can be a recognizable position of the hand, such as pointing upward with the index finger. As an additional example, the gesture can be an exaggerated speaking of "hello" that can be lip read by communication devices 100a-100c.

Figure 3B:
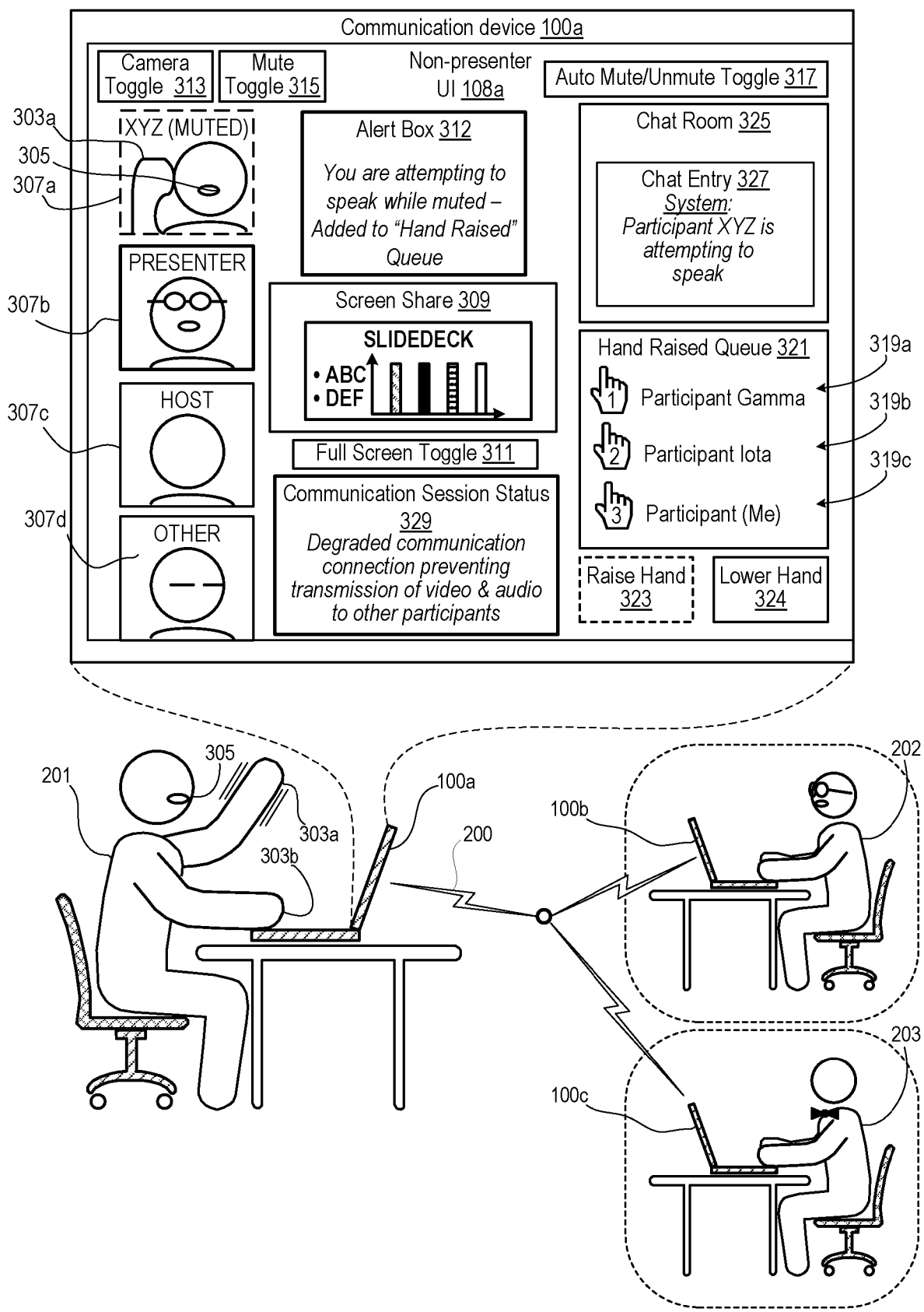
FIG. 3B depicts a non-presenter user interface presented on a display of one of the three communication devices of FIG. 3A, according to one or more embodiments.

FIG. 3B depicts a non-presenter user interface 108a presented on local communication device 100a and used by non-presenting participant 201 during a video communication session. Communication system 200 communicatively couples communication device 100b used by presenting participant 202 and communication device 100c used by host participant 203 to local communication device 100a. Detection by local communication device 100a of a non-presenting participant 201 attempting to speak are determined based on movements of one or more hands 303a-303b or based on movement of mouth 305 of non-presenting participant 201. In response to local communication device 100a detecting movements that correspond to an attempt by non-presenting participant 201 to speak, local communication device 100a can present an alert on non-presenter user interface 108a indicating to non-presenting participant 201 that microphone of local communication device 100a is muted. In one or more embodiments, non-presenter user interface 108a can present local image stream as video inset box 307a and can present one or more received remote image streams as video inset boxes 307b-307d. In one or more embodiments, the number of participants can exceed available display locations to present all remote image streams. Audio inputs received from the respective remote image streams can automatically prioritize particular video inset boxes to display. Screen share box 309 takes up the full screen by selecting full screen toggle button 311. Detection of an attempt to speak by non-presenting participant 201 can automatically resize screen share box 309 to present an alert or can position an alert within alert box 312 on top of screen share box 309.

Non-presenting user interface 108a includes camera toggle button 313 to locally turn off/on image capturing device 102 (FIG. 1) of communication device 100b. Non-presenting user interface 108a includes mute button 315 to locally turn on/off microphone 104 (FIG. 1) of communication device 100b. Presenting user interface 108b can also include toggle button 317 to enable automatic muting and unmuting based on movements of non-presenting participant 201.

In one or more embodiments, user interface 108a can include alternate visual tools to communicate with other participants, such an enabling selections to "raise hand", which adds a respective one of hand raised indications 319a-319c corresponding to participant to hand raised queue 321. User interfaces 108b-108c (FIG. 3A) can similarly include alternate visual tools to communicate with other participants, such an enabling selections to "raise hand", which adds a respective one of hand raised indications 319a-319c corresponding to participant to hand raised queue 321. For example, non-presenting participant 201 can select raise hand button 323 to add hand raised indication 319c to the hand raised queue 321. Non-presenting participant 201 can also select lower hand button 324 to clear hand raised indication 319c. Participants 201-203 can also use chat box 325 to send text messages to some or all of other participants 201-203. Automated alert of a detected attempt by non-presenting participant 201 to speak can be provided to other participants via chat box 325 as chat entry 327. Automated alert of a detected attempt by non-presenting participant 201 to speak can be provided in a pop-up alert box 328. In addition to detecting an inadvertent speaking while muted scenario, non-presenting participant 201 can also intentionally use the automatic visual detection as an intuitive and expeditious way to get the attention of presenting participant 202. Non-presenting participant 201 can make movements that will cause one or more alerts to be generated and presented.

In addition to alerting presenting participant 202 of a detected attempt by non-presenting participant 201 to speak, similar alerts can be included in presenter user interface 108b such as detecting when communication is interrupted to one or more other participants 201 and 203. Communication session status box 329, for example, can alert presenting participant 202 when speaking should be paused until transmission to other participants (202-203) becomes available.

Figure 4A:
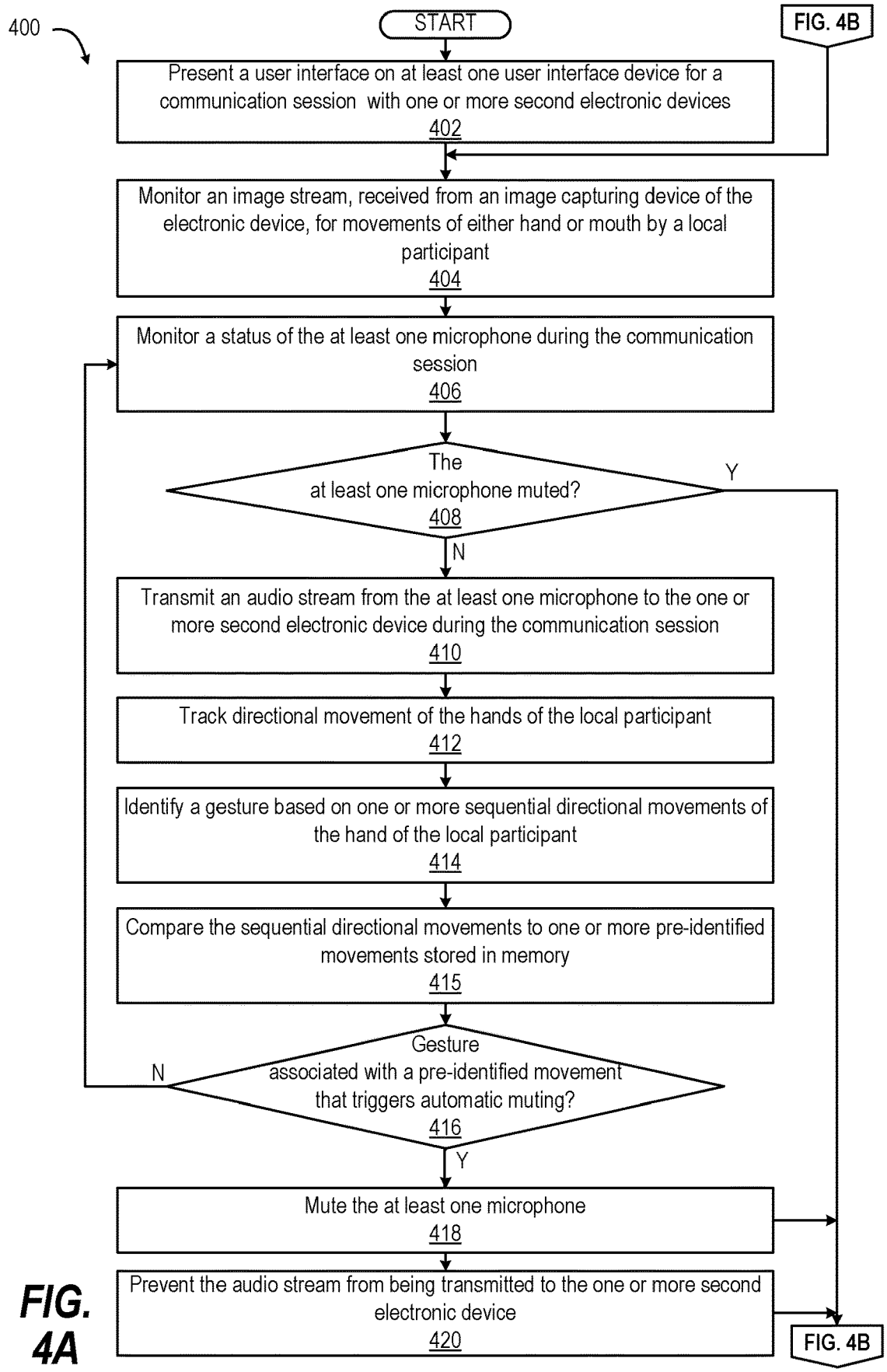
FIGS. 4A-4B present a flow diagram of a method for reducing loss of communication between participants in a communication session when a local participant attempts to speak without manually unmuting the electronic device, according to one or more embodiments.
Figure 4B:
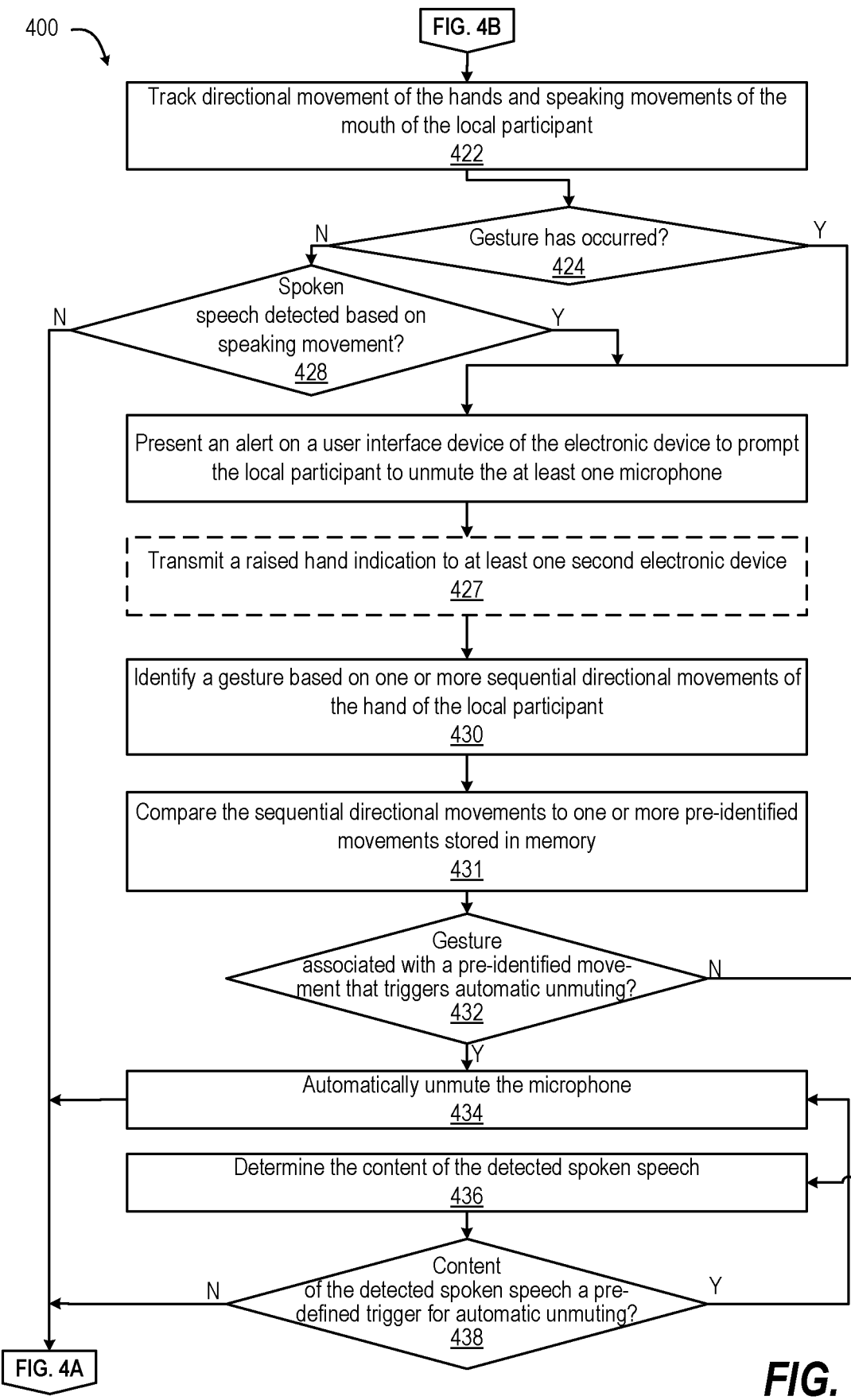

FIGS. 4A-4B (FIG. 4) present a flow diagram of a method for reducing loss of spoken communication between participants in a communication session when a local participant attempts to speak without manually unmuting the local electronic device, such as communication device 100 (FIG. 1). In at least one embodiment, communication device 100, managed by controller 101, executes video conference application 105 (FIG. 1) to facilitate the communication session. In one or more embodiments, video conference application 105 (FIG. 1) is implemented in browser 240 (FIG. 2). Browser 240 is executed by controller 101. Some functionality of the communication session can be executed by network server 208 (FIG. 2). The description of method 400 is provided with general reference to the specific components illustrated within the preceding FIGS. 1, 2A-2B and 3A-3B, and specific components referenced in method 400 can be identical or similar to components of the same name used in describing preceding FIGS. 1, 2A-2B and 3A-3B. With reference to FIG. 4A, method 400 includes presenting a user interface on at least one user display device 110 for a communication session with one or more second electronic devices (block 402). Method 400 includes monitoring an image stream, received from an image capturing device of the electronic device, for movements of either hand or mouth of a local participant (block 404).

In one or more embodiments, method 400 includes monitoring the image stream from the image capturing device further in response to determining that the electronic device is stationary such as in a dock and is communicatively coupled to an external user interface device such as a monitor or laptop. In one or more embodiments, the communication session is a video conference. In one or more embodiments, the image capturing device is not transmitting an image stream of the local participant, thus preventing other participants from seeing when the local participant is trying to speak. In one or more embodiments, the image capturing device is transmitting an image stream of the local participant to one or more second electronic devices, but the other participants may not see the image stream due to user interface prioritization of displayed content. The other participants may not notice that the local participant wants to speak or has stated speaking while his/her device is on mute.

Method 400 includes monitoring a status of the at least one microphone during the communication session (block 406). Method 400 includes determining whether the at least one microphone is muted to the local participant (decision block 408). In response to determining that the microphone is not muted, method 400 includes transmitting any audio stream detected from the at least one microphone to the one or more second electronic device during the communication session (block 410). To support hands-free operation without interfering with other participants who are speaking, method 400 includes tracking directional movement of the hands of the local participant (block 412). Method 400 includes identifying a gesture based on one or more sequential directional movements of the hand of the local participant (block 414). Method 400 includes comparing the sequential directional movements to one or more pre-identified movements stored in memory (block 415). Method 400 includes determining whether the gesture is associated with a pre-identified movement that triggers automatic unmuting of the at least one microphone (decision block 416). As an example, controller 101 (FIG. 1) can access pre-defined movement data 122 in device memory 106 that includes pre-defined gesture data 269 such as mute gesture 271*a*. Mute gesture 271*a* defines a slashing movement of the finger across the neck associated with automatic muting. In response to determining that the gesture is not associated with the pre-defined movement that triggers automatic muting, method 400 returns to block 406. In response to determining that the gesture is associated with the pre-defined movement that triggers automatic muting, method 400 includes muting the at least one microphone (block 418). In one or more embodiments, muting of the at least one microphone turns off audio sensing by the microphone. The audio input becomes unavailable to the local electronic device as well as remote electronic devices. In one or more embodiments, muting of the at least one microphone only prevents sharing of the audio input received by the at least one microphone to other electronic devices. In response to determining that the microphone is muted in decision block 408 or after muting the microphone in block 418, method 400 includes preventing the audio stream from being transmitted to the one or more second electronic devices (block 420).

In FIG. 4B, method 400 includes tracking directional movement of the hands and speaking movements of the mouth of the local participant (block 422). Method 400 includes determining whether a gesture has been detected within the video stream and which gesture was detected (decision block 424). In one or more embodiments, the determining includes retrieving images from memory (see FIG. 3B) that correspond to various gestures or sequence of movements that correspond to the gestures and comparing the movement within the received image stream with those presented within the retrieved images to identify whether a gesture was performed by the participant, and which gesture was identified. In response to determining that a gesture was identified within the image stream that is associated with the participant speaking or requesting to speak, method 400 includes presenting an alert on a user interface device of the electronic device to prompt the local participant to unmute the at least one microphone (block 426). In one or more embodiments, method 400 further includes transmitting a raised hand indication to at least one second electronic device to alert the associated second participant that the local participant is desirous of speaking or has started speaking (block 427). In one or more embodiments, method 400 includes presenting the alert that the at least one microphone is muted. In different embodiments, the alert is presented as one or more of an audible output, a visual output, and a haptic output via an integrated output device of the electronic device or on the external output device. In response to determining that a gesture has not occurred in decision block 424, method 400 includes determining whether spoken speech is detected based on the speaking movement of the mouth of the local participant (decision block 428). In this embodiment, the determination of whether spoken speech is detected occurs without the use of microphone or soft mute feature. Relying upon the mouth movement can avoid inadvertently accepting a spoken command due to other people speaking in the vicinity of the local participant. In one or more embodiments, although the microphone is muted, the audio input may still be locally available to the controller. In one embodiment, the determination of spoken speech can further depend on detecting a corresponding audio input by the at least one microphone. Confirmation that the mouth movements are accompanied by matching spoken words mitigates misinterpreting other reasons for movement of the mouth.

In response to determining that spoken speech is detected based on the speaking movement of the mouth of the local participant, method 400 proceeds to block 426. In response to not detecting the speaking movement of the mouth of the local participant, method 400 returns to block 404.

In one or more embodiments, after presenting the alert, method 400 would return to block 404 (FIG. 4A). Method 400 includes identifying one or more sequential directional movements of the hand of the local participant (block 430). Method 400 includes comparing the sequential directional movements to one or more pre-identified movements stored in memory (block 431). Method 400 includes determining whether the sequence of hand movements is a gesture associated with a pre-identified movement that triggers automatic unmuting of the at least one microphone (decision block 432). According to one or more embodiments, the determining includes retrieving images from memory (see FIG. 3B) that correspond to various gestures or sequence of movements that correspond to the unmute and mute functions and comparing the movement within the received image stream with those presented within the retrieved images to identify whether a gesture was performed by the participant. In response to determining that the gesture is associated with the pre-defined movement that triggers automatic unmuting, method 400 includes automatically unmuting the microphone (block 434). Then method 400 returns to block 404 (FIG. 4A).

In response to determining that the gesture is not associated with the pre-defined movement that triggers automatic unmuting, method 400 includes identifying content of the spoken speech (block 436). Method 400 includes determining whether the content of the detected spoken speech is a pre-defined trigger to unmute the at least one microphone (decision block 438). In one or more embodiments, the determination of the pre-defined trigger includes one or more additional factors such as identifying movements of the mouth of sufficient distance and for a sufficient time. The pre-defined trigger can include a number and rate of change of the mouth opening and closing. For example, a brief cough or yawn would be insufficiently short or include a single mouth movement that is insufficient to be deemed an attempt to speak. In response to determining that the movement of the mouth does not correspond to spoken speech that is a pre-defined trigger, method 400 returns to block 404 (FIG. 4A). In response to determining that the movement of the mouth corresponds to spoken speech that is a pre-defined trigger, method 400 returns to block 434.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
   an image capturing device;
   at least one user interface device comprising at least one microphone;
   a controller communicatively coupled to the image capturing device and to the at least one user interface device, and which:
      monitors, during a communication session with one or more second electronic devices while the at least one microphone is soft muted, an image stream received from the image capturing device for movements by a local participant in the communication session;
      monitors a status of the at least one microphone during the communication session;
      autonomously generates a prompt to unmute the microphone in response to determining that the microphone is soft muted while identifying at least one of a speaking movement of a mouth of the local participant to speak or a gesture by the local participant that correlates with the participant wanting to speak, wherein audio input detected at the microphone is still available to the controller, while the at least one microphone is soft muted;
      detects audible sounds sensed by the microphone; and
      triggers automatic unmuting of the at least one microphone from being soft muted, based on the speaking movement of the mouth corresponding to audible sounds sensed by the microphone.

2. The electronic device of claim 1, further comprising an output device, wherein the controller generates the prompt to unmute the microphone by presenting an alert via the output device indicating that the microphone is muted.

3. The electronic device of claim 2, wherein the controller autonomously generates the prompt to unmute the microphone by transmitting a hand raising indication to at least one second electronic device.

4. The electronic device of claim 1, wherein the controller:
presents a user interface for the communication session on a communicatively coupled external output device;
monitors the image stream from the image capturing device further in response to determining that the electronic device is stationary; and
generates the prompt to unmute the microphone by presenting the alert that the microphone is muted to the local participant via the external output device.

5. The electronic device of claim 1, wherein, the controller generates the prompt to unmute the microphone and automatically unmutes the microphone in response to determining that at least one of the speaking movement detected of the mouth or the gesture of the hand of the local participant corresponds to a pre-identified movement that triggers the automatic unmuting.

6. The electronic device of claim 5, wherein, in determining that the movement corresponds to the pre-identified movement that triggers the automatic unmuting, the controller:
tracks directional movement of a hand of the local participant;
identifies a gesture based on one or more sequential directional movements of the hand of the local participant; and
associates the gesture with the pre-identified movement that triggers the automatic unmuting.

7. The electronic device of claim 1, wherein to trigger automatic unmuting of the at least one microphone from being soft muted, the controller:
compares the audible sounds to the speaking movements detected by the image capturing device; and
confirms that the speaking movements of the mouth are accompanied by matching spoken words, to mitigate misinterpreting a reason for the movement of the mouth.

8. The electronic device of claim 1, wherein the controller:
identifies content of detected spoken speech;
determines whether the content of the detected spoken speech comprises a predefined trigger to unmute the at least one microphone; and
autonomously unmuting the at least one microphone further in response to the content of the detected spoken speech comprising the predefined trigger.

9. The method of claim 1, wherein triggering automatic unmuting of the at least one microphone from being soft muted further comprises:
comparing the audible sounds to the speaking movements detected by the image capturing device; and
confirming that the speaking movements of the mouth are accompanied by matching spoken words, to mitigate misinterpreting a reason for the movement of the mouth.

10. A method comprising:
monitoring, during a communication session with one or more second electronic devices while the at least one microphone is soft muted, an image stream received from an image capturing device of an electronic device for movements by a local participant in the communication session;
monitoring a status of the at least one microphone during the communication session;
generating a prompt to unmute the microphone in response to determining both: (i) that the microphone is soft muted; and (ii) speaking movement of one of a mouth to speak or a hand of the local participant performing a gesture associated with an attempt to speak, wherein audio input detected at the microphone is still available to the controller, while the at least one microphone is soft muted;
detecting audible sounds sensed by the microphone; and
triggering automatic unmuting of the at least one microphone from being soft muted, based on the speaking movement of the mouth corresponding to audible sounds sensed by the microphone.

11. The method of claim 10, wherein generating the prompt to unmute the microphone comprises presenting an alert via an output device that the microphone is muted.

12. The method of claim 10, wherein autonomously generating the prompt to unmute the microphone comprises transmitting a hand raising indication to at least one second electronic device.

13. The method of claim 10, further comprising:
presenting a user interface for the communication session on a communicatively coupled external output device;
monitoring the image stream from the image capturing device further in response to determining that the electronic device is stationary; and
generating the prompt to unmute the microphone by presenting the alert that the microphone is muted o the local participant via the external output device.

14. The method of claim 10, further comprising generating the prompt to unmute the microphone and automatically unmutes the microphone in response to determining that at least one of the speaking movement detected of the mouth or gesture of the hand of the local participant corresponds to a pre-identified movement that triggers the automatic unmuting.

15. The method of claim 14, wherein determining that the speaking movement of one of the mouth or a gesture of the hand of the local participant is associated with a communication setting enabling the automatic unmuting comprises:
tracking directional movement of the hand of the local participant;
identifying a gesture based on one or more sequential directional movements of the hand of the local participant; and
associating the gesture with the pre-identified movement that triggers the automatic unmuting.

16. A computer program product comprising:
a computer readable storage device; and
program code on the computer readable storage device that when executed by a processor associated with a device, the program code enables the communication device to provide the functionality of:
monitoring, during a communication session with one or more second electronic devices while the at least one microphone is soft muted, an image stream received from an image capturing device of an electronic device for movements by a local participant participating in the communication session;
monitoring a status of the at least one microphone during the communication session;
generating a prompt to unmute the microphone in response to determining both: (i) that the microphone is soft muted; and (ii) speaking movement of one of a mouth to speak or a hand of the local participant performing a gesture associated with an attempt to speak, wherein audio input detected at the microphone is still available to the controller, while the at least one microphone is soft muted;
detecting audible sounds sensed by the microphone; and
triggering automatic unmuting of the at least one microphone from being soft muted, based on the speaking movement of the mouth corresponding to audible sounds sensed by the microphone.

17. The computer program product of claim 16, wherein the program code enables the communication device to provide the functionality of:
presenting a user interface for the communication session on a communicatively coupled external output device;
monitoring the image stream from the image capturing device further in response to determining that the electronic device is stationary; and
generating the prompt to unmute the microphone by presenting the alert that the microphone is muted to the local participant via the external output device.

18. The computer program product of claim 16, wherein the program code enables the communication device to provide the functionality of:
generating the prompt to unmute the microphone and automatically unmutes the microphone in response to determining that the movement detected of the hand of the local participant corresponds to a pre-identified movement that triggers the automatic unmuting by:
tracking directional movement of the hand of the local participant;
identifying a gesture based on one or more sequential directional movements of the hand of the local participant; and
associating the gesture with the pre-identified movement that triggers the automatic unmuting.

19. The computer program product of claim 16, wherein the program code enables the communication device to provide the functionality of triggering the automatic unmuting based on the detected movement of the mouth that corresponds to audible sounds sensed by the microphone.

20. The computer program product of claim 16, wherein the program code for triggering automatic unmuting of the at least one microphone from being soft muted comprises code that enables the communication device to provide the functionality of:
comparing the audible sounds to the speaking movements detected by the image capturing device; and
confirming that the speaking movements of the mouth are accompanied by matching spoken words, to mitigate misinterpreting a reason for the movement of the mouth.

\* \* \* \* \*